United States Patent
Sheng et al.

(10) Patent No.: US 10,299,297 B2
(45) Date of Patent: May 21, 2019

(54) NETWORK CONNECTION MODULE, COMPUTER PROGRAM, AND NETWORK CONNECTION METHOD THEREOF

(71) Applicants: Shih-Chao Sheng, Qionlin Township (TW); Ming-Yi Wang, Qionlin Township (TW); Enoch Zhao, Qionlin Township (TW); Huan-Ruei Shiu, Qionlin Township (TW); Chien-Ju Hung, Qionlin Township (TW)

(72) Inventors: Shih-Chao Sheng, Qionlin Township (TW); Ming-Yi Wang, Qionlin Township (TW); Enoch Zhao, Qionlin Township (TW); Huan-Ruei Shiu, Qionlin Township (TW); Chien-Ju Hung, Qionlin Township (TW)

(73) Assignee: Gunitech Corp., Hsinchu County (TW)

( * ) Notice: Subject to any disclaimer, the term of this patent is extended or adjusted under 35 U.S.C. 154(b) by 0 days.

(21) Appl. No.: 14/870,411

(22) Filed: Sep. 30, 2015

(65) Prior Publication Data

US 2016/0302239 A1 Oct. 13, 2016

(30) Foreign Application Priority Data

Apr. 10, 2015 (TW) .............................. 104111674 A

(51) Int. Cl.
| | |
|---|---|
| *H04W 12/06* | (2009.01) |
| *H04W 76/10* | (2018.01) |
| *H04W 84/18* | (2009.01) |
| *H04W 76/12* | (2018.01) |

(52) U.S. Cl.
CPC ............ *H04W 76/10* (2018.02); *H04W 76/12* (2018.02); *H04W 84/18* (2013.01)

(58) Field of Classification Search
CPC ..... H04W 84/18; H04W 76/02; H04W 40/14; H04W 40/24
See application file for complete search history.

(56) References Cited

U.S. PATENT DOCUMENTS

| | | | |
|---|---|---|---|
| 7,626,508 B2 | 12/2009 | Kosuge et al. | |
| 2013/0258872 A1* | 10/2013 | Drake | ................. H04L 41/0833 370/252 |
| 2014/0355420 A1 | 12/2014 | Tran et al. | |
| 2015/0023245 A1 | 1/2015 | Du et al. | |
| 2015/0341331 A1* | 11/2015 | Weksler | ................. H04L 63/08 726/4 |

FOREIGN PATENT DOCUMENTS

CN           103415061 A      11/2013

* cited by examiner

*Primary Examiner* — Lakeram Jangbahadur
(74) *Attorney, Agent, or Firm* — Alan D. Kamrath; Kamrath IP Lawfirm, P.A.

(57) ABSTRACT

A network connection method is used for allowing a portable electronic device to connect to a node in a mesh network environment. The method includes the steps of: searching a plurality of nodes; determining whether there is a specific node in the plural of nodes; if yes, setting the specific node as a bridging point; if not, setting a node with the strongest signal strength in the plurality of nodes as the bridge point; and broadcasting to the other nodes via the bridge point under the mesh network environment.

3 Claims, 5 Drawing Sheets

ND NETWORK
NETWORK CONNECTION MODULE, COMPUTER PROGRAM, AND NETWORK CONNECTION METHOD THEREOF

BACKGROUND OF THE INVENTION

1. Field of the Invention

The present invention relates to a network connection module and a network connection method thereof. More particularly, the present invention relates to a network connection module and a network connection method thereof for continuously keeping a connection to a node.

2. Description of the Related Art

As technology develops, many kinds of wireless network applications are also developed as well, and some wireless network applications are also applied to an automatic connection method for domestic appliances. A mesh network environment, for example using the CSRmesh™ technology of the CSR company, is already disclosed in the prior art. The mesh network environment has some advantage, such as it has no distance limitation and it does not need the hub to achieve the object of home automation controlling. Via this technology, the user can use the portable electronic device to connect to and control different domestic appliances with the node. However, this technology must keep the connection to the node which is considered to be the bridging point. When the distance between the user and the bridging point is too far, the portable electronic device will break the connection to the node which was considered to be the bridging point, and will try to connect to another node and set this node to be the bridging point. Therefore, the portable electronic device will be often connected to different nodes, which may easily cause the delay of the signal transmission.

Therefore, there is a need to provide a new network connection module and a network connection method thereof, to solve the disadvantage of the prior art.

SUMMARY OF THE INVENTION

It is an object of the present invention to provide a network connection module, for continuously keeping a connection to a node.

It is another object of the present invention to provide a network connection method applied to the abovementioned module.

To achieve the abovementioned objects, the network connection module of the present invention is used for allowing the portable electronic device to connect to a node in a mesh network environment. The network connection module includes a searching module, a processing module and a connection establishing module. The searching module is used for searching a plurality of nodes. The processing module is electrically connected to the searching module, for determining whether there is a specific node in the plurality of nodes. If yes, setting the specific node as a bridging point; and if not, setting a node with the strongest signal strength in the plurality of nodes as the bridge point. The connection establishing module is electrically connected to the processing module, used for broadcasting to the other of the plurality of nodes in the mesh network environment via the bridging point.

The network connection method of the present invention is used for allowing the portable electronic device to connect to a node in a mesh network environment. The method includes: searching a plurality of nodes; determining whether there is a specific node in the plurality of nodes; if yes, setting the specific node as a bridging point; if not, setting a node with the strongest signal strength in the plurality of nodes as the bridge point; and via the bridging point, broadcasting to the other of the plurality of nodes in the mesh network environment.

DETAILED DESCRIPTION OF THE PREFERRED EMBODIMENTS

These and other objects and advantages of the present invention will become apparent from the following description of the accompanying drawings, which disclose several embodiments of the present invention. It is to be understood that the drawings are to be used for purposes of illustration only, and not as a definition of the invention.

Figure 1:
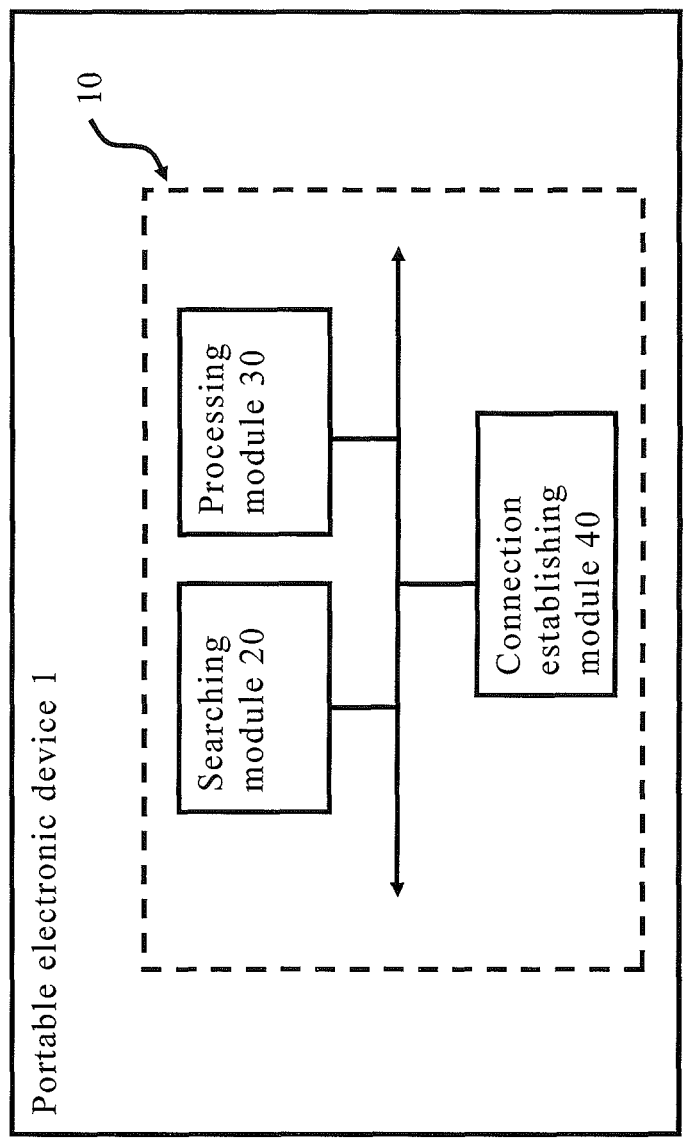
FIG. 1 illustrates a structure drawing of the network connection module of the present invention.

Please refer to FIG. 1, which illustrates a structure drawing of the network connection module 10 of the present invention.

The network connection module 10 of the present invention is used for allowing a portable electronic device 1 to connect to a node in a mesh network environment. The portable electronic device 1 can be a cellphone or a tablet computer. Each node, such as the nodes 51a to 51g shown in FIG. 3A, can represent a controlled device, such as a television, a refrigerator, an oven or other household device, but the present invention is not limited to that design. The network connection module 10 and its modules can be formed via a hardware device, a software program combined with a hardware device, or a firmware combined with a hardware device, such as a computer program stored in a computer readable storage medium, but the present invention is not limited to the abovementioned description.

The network connection module 10 includes a searching module 20, a processing module 30 and a connection establishing module 40. The searching module 20 is used for searching a plurality of nodes, and each node corresponds to different controlled devices. The processing module 30 is electronically connected to the searching module 20 and is used for determining if there is a specific node in the plurality of nodes searched by the searching module 20. The specific node can be a wearable device or a positioning device, but the present invention is not limited to that design. If there is not any specific node, the processing module 30 will set a node with the strongest signal strength in the plurality of nodes to be the bridging point. If there is a specific node, the processing module 30 will set the specific node as a bridging point. The connection establishing module 40 is electrically connected to the processing module 30 and is used for broadcasting the related signal to the other plurality of nodes via the bridging point in the mesh network environment.

Besides, if the processing module 30 further determines that there are a plurality of specific nodes in the plurality of nodes, it can set the specific node with the strongest signal strength to be the bridging point, or set the bridging point according to the predetermining hierarchy. However, the present invention is not limited to that design. Therefore, if the processing module 30 finds the specific node, the path for transferring the signal will be fixed, and it will not be changed even if the portable electronic device 1 moves.

It is to be known that, the present embodiment is only used for showing preferred embodiments of the present invention. To avoid further description, all the possible changes and combinations will not be described in detail. However, for people having ordinary skill in this art of the present invention, the abovementioned modules or units may not be necessary. To implement the present invention, the invention may also include other detail modules or units of the prior art. Each module or unit may be reduced or changed based on requirement, and other modules or units may be installed between any two modules.

Figure 2:
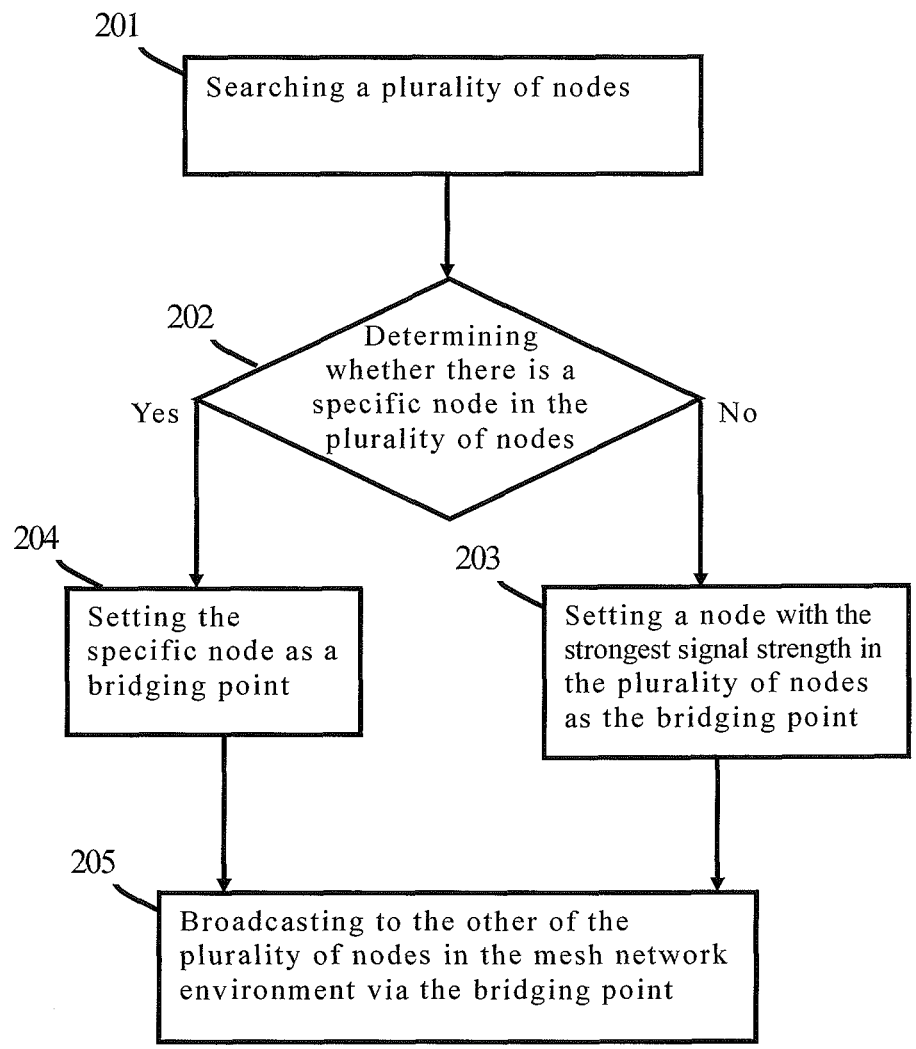
FIG. 2 illustrates a flowchart of the network connection method of the present invention.

Please refer to FIG. 2, which illustrates a flowchart of the network connection method of the present invention. It is to be known that, although the following description uses the abovementioned network connection module 10 to describe the network connection method of the present invention, the network connection method of the present invention is not limited to use the same structure as the network connection module 10.

First, performing Step 201: searching a plurality of nodes.

Figure 3A:
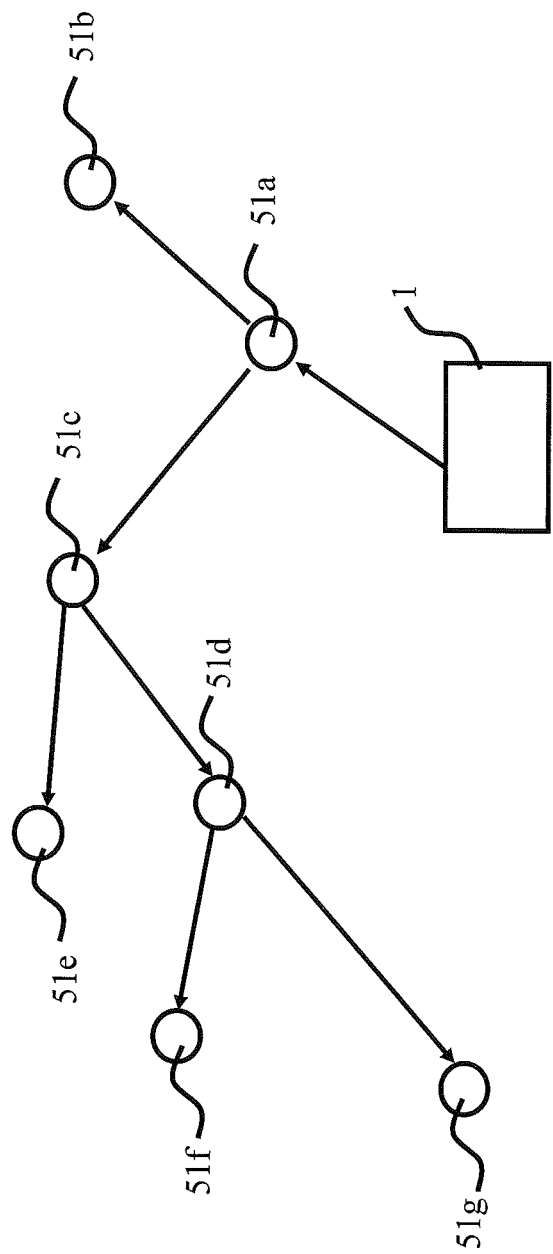
FIG. 3A illustrates a schematic drawing of the portable electronic device in the mesh network environment of the first embodiment of the present invention.

First, using the searching module 20 to search a plurality of nodes. Please refer to FIG. 3A, which illustrates a schematic drawing of the portable electronic device 1 in the mesh network environment of the first embodiment of the present invention. The searching module 20 finds the nodes 51a, 51b, 51c, 51d, 51e, 51f, 51g as shown in FIG. 3A, and each node corresponds to different controlled devices.

Then, performing Step 202: determining whether there is a specific node in the plurality of nodes.

Then, the processing module 30 determines whether there is a specific node in the plurality of nodes searched by the searching module 20.

If the processing module 30 determines that there is not any specific node in the plurality of nodes 51a to 51g, performing Step 203: setting a node with the strongest signal strength in the plurality of nodes as the bridging point.

As shown in FIG. 3A, in the plurality of nodes 51a to 51g, the processing module 30 sets the node 51a with the strongest signal strength to be the bridging point.

On the other hand, if the processing module 30 finds a specific node 52, Step 204 is performed: setting the specific node as a bridging point.

Figure 3B:
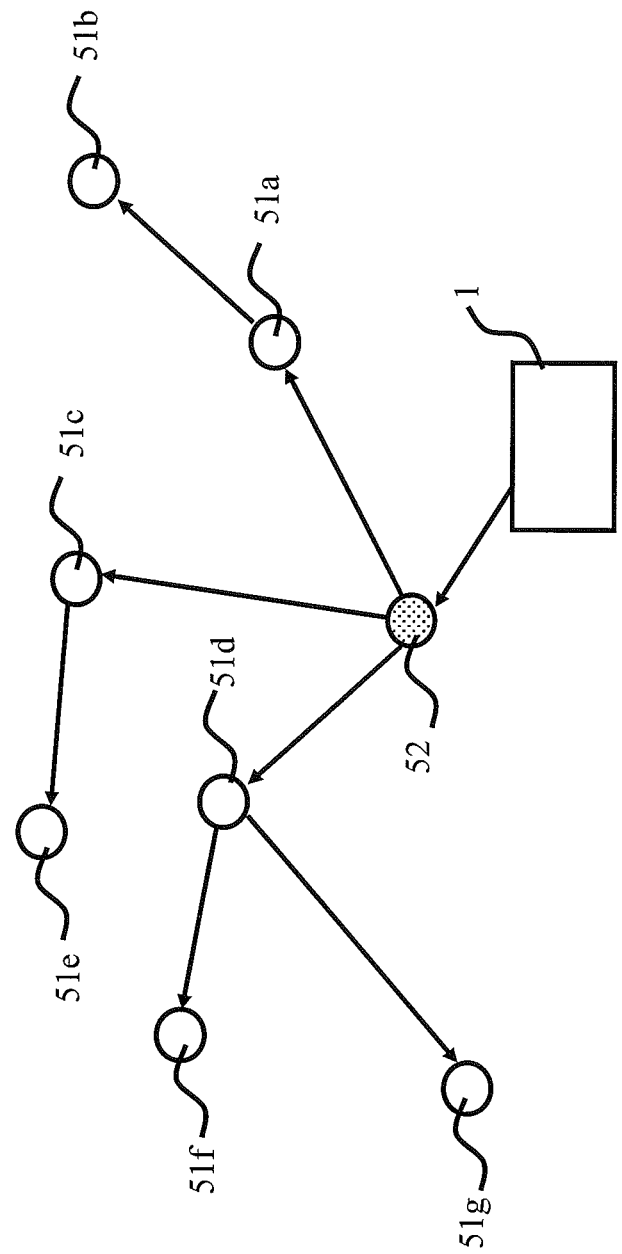
FIG. 3B illustrates a schematic drawing of the portable electronic device in the mesh network environment of the second embodiment of the present invention.

As shown in FIG. 3B, which illustrates, a schematic drawing of the portable electronic device 1 in the mesh network environment of the second embodiment of the present invention. If the processing module 30 finds the specific node 52, the processing module 30 will directly set the specific node 52 as the bridging point and the connection establishing module 40 can be connected to the specific node 52 directly. No matter which node the portable electronic device 1 is close to, the connection establishing module 40 only connects to the specific node 52 and does not change the connecting path.

Figure 3C:
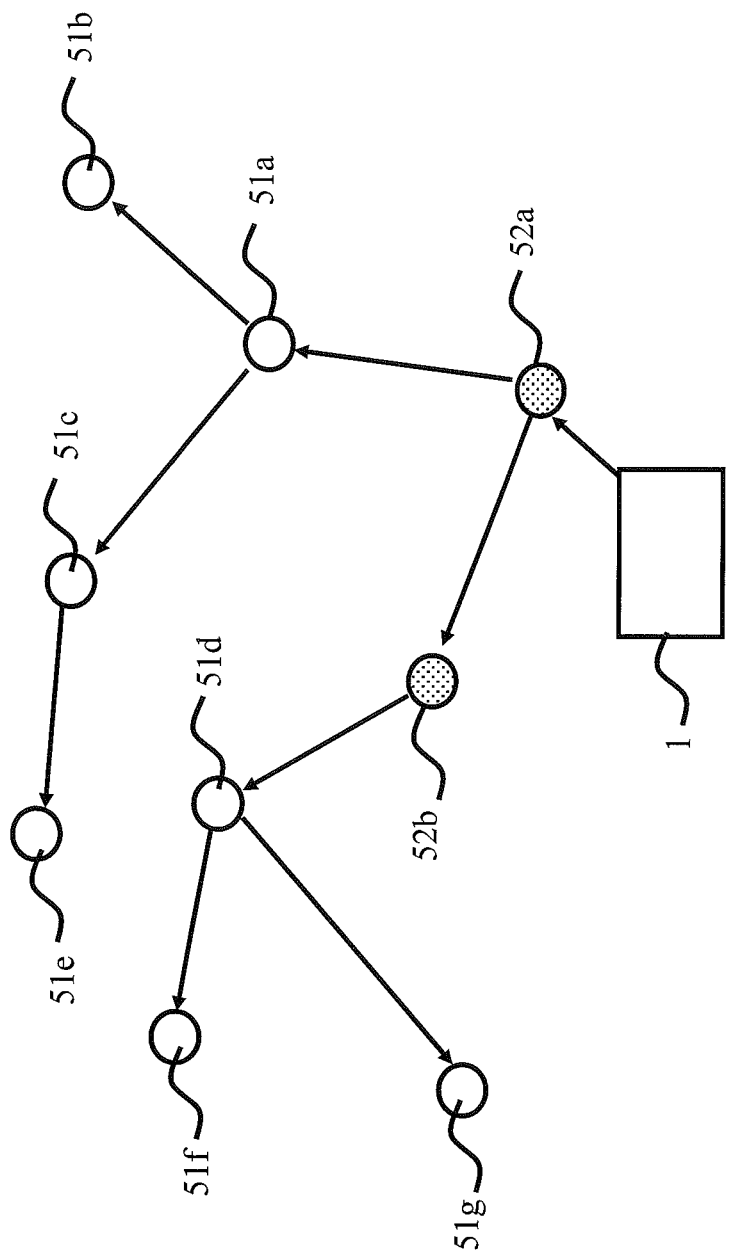
FIG. 3C illustrates a schematic drawing of the portable electronic device in the mesh network environment of the third embodiment of the present invention.

Besides, as shown in FIG. 3C, if the processing module 30 finds the plurality of specific nodes, such as the first specific node 52a and the second specific node 52b shown in FIG. 3C, then, the processing module 30 can determine based on the strongest signal strength or the predetermining hierarchy. Therefore, as shown in FIG. 3C, the processing module 30 stably sets the first specific node 52a to be the bridging point.

Finally, performing Step 205: broadcasting to the other of the plurality of nodes in the mesh network environment via the bridging point.

In the previous steps, whether the processing module 30 chooses the node 51a, the specific node 52 or the first specific node 52a to be the bridging point, the connection establishing module 40 will finally broadcast the related signal to the other plurality of nodes 51b, 51c, 51d, 51e, 51f, 51g via the bridging point in the mesh network environment, allowing the portable electronic device 1 to control the nodes 51b to 51g and the controlled device. Because the final broadcast connecting and controlling for the other plurality of nodes 51b, 51c, 51d, 51e, 51f, 51g are already disclosed for people having ordinary skill in this art of the present invention, there is no need for further description.

It is to be known that, the step order of the network connection method of the present invention is not limited to the abovementioned description, and the abovementioned step order can be changed if the object of the present invention can be achieved.

Via the network connection module 10 and the network connection method of the present invention, the connection between the portable electronic device 1 and the node can be kept continuously, to reduce the re-connecting time.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope of the invention.

What is claimed is:

1. A network connection method comprising:
searching a plurality of nodes in a mesh network environment;
determining whether there is at least one specific node in the plurality of nodes, wherein the specific node being a wearable device or a positioning device;
wherein the at least one specific node is not a node with a strongest signal strength in the plurality of nodes;
when a determination is made that there is a first specific node in the plurality of nodes, setting the first specific node as a bridging point with a portable electronic device directly connected to the bridging point first;
when a determination is made that there are a plurality of specific nodes in the plurality of nodes, setting one of the plurality of specific nodes with a strongest signal strength or one of the plurality of specific nodes according to a predetermined hierarchy as the bridging point with the portable electronic device directly connected to the bridging point first;
when the at least one specific node is not the first specific node in the plurality of nodes, setting one node with a strongest signal strength in the plurality of nodes as the bridging point with the portable electronic device directly connected to the bridging point first; and
via the bridging point, broadcasting to others of the plurality of nodes in the mesh network environments;
wherein when the bridging point is set, a path for transferring a signal is fixed, and is not changed when the portable electronic device moves.

2. A hardware device including a non-transitory computer program product applied to the portable electronic device to achieve the network connection method as claimed in claim 1.

3. A network connection module, used for allowing a portable electronic device to be connected to a node in a mesh network environment, with the network connection module comprising:
- a searching module configured to search a plurality of nodes in a mesh network environment;
- a processing module, electrically connected to the searching module, configured to determine whether there is at least one specific node in the plurality of nodes; wherein the specific node being a wearable device or a positioning device;
- wherein the at least one specific node is not a node with a strongest signal strength in the plurality of nodes;
- when there is a first specific node in the plurality of nodes, setting the first specific node as a bridging point with the portable electronic device directly connected to the bridging point first;
- when there area plurality of specific nodes in the plurality of nodes, setting one of the plurality of specific nodes with either a strongest signal strength or according to a predetermined hierarchy as the bridging point first;
- when at least one specific node is not the first specific node in the plurality of nodes, setting one node with a strongest signal strength in the plurality of nodes as the bridging point with the portable electronic device directly connected to the bridging point first;
- and a connection establishing module, electrically connected to the processing module, configured to broadcast to others of the plurality of nodes in the mesh network environment via the bridging point;
- wherein when the processing module selects the bridging point, a path for transferring a signal is fixed, and is not changed when the portable electronic device moves.

* * * * *